United States Patent
Hayakawa

(10) Patent No.: US 9,971,557 B2
(45) Date of Patent: May 15, 2018

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Takeshi Hayakawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 14/517,631

(22) Filed: Oct. 17, 2014

(65) Prior Publication Data

US 2015/0116755 A1 Apr. 30, 2015

(30) Foreign Application Priority Data

Oct. 25, 2013 (JP) ................................. 2013-222627

(51) Int. Cl.
*G06F 3/12* (2006.01)
*H04L 29/08* (2006.01)
*G06F 17/30* (2006.01)
*G06K 15/00* (2006.01)

(52) U.S. Cl.
CPC ............ *G06F 3/1274* (2013.01); *G06F 3/121* (2013.01); *G06F 3/1288* (2013.01); *G06F 3/1292* (2013.01); *G06F 17/30887* (2013.01); *G06K 15/007* (2013.01); *G06K 15/408* (2013.01); *G06F 3/1247* (2013.01)

(58) Field of Classification Search
CPC .... G06F 3/1203; G06F 3/1204; G06F 3/1226; G06F 3/1228; G06F 3/1272; G06F 3/1287; G06F 3/1293; G06F 3/1247; G06F 3/121; G06F 3/1288; G06F 3/1292; G06F 17/30887; G06F 3/1274; G06K 15/4095; G06K 15/007; G06K 15/408; H04L 67/10

USPC .................................................. 358/1.14, 1.1
See application file for complete search history.

(56) References Cited

U.S. PATENT DOCUMENTS

| 8,693,018 B2 | 4/2014 | Ito | |
|---|---|---|---|
| 2004/0054650 A1* | 3/2004 | Chun | H04M 1/72522 |
| 2009/0006651 A1* | 1/2009 | Kim | G06F 17/30905 709/246 |
| 2009/0282485 A1* | 11/2009 | Bennett | G06F 21/51 726/24 |
| 2010/0171973 A1* | 7/2010 | Kimura | 358/1.14 |
| 2013/0135673 A1* | 5/2013 | Murakawa | G06F 3/1296 358/1.15 |
| 2013/0188216 A1* | 7/2013 | Katahira | 358/1.14 |

(Continued)

FOREIGN PATENT DOCUMENTS

JP 2013-50804 3/2013

*Primary Examiner* — Iriana Cruz
(74) *Attorney, Agent, or Firm* — Fitzpatrick, Cella, Harper & Scinto

(57) ABSTRACT

An information processing apparatus according to the present invention transmits first data to an external information processing apparatus after receiving an instruction for printing from a user, downloads second data obtained by converting the first data from the external information processing apparatus, transmits the second data to an image forming apparatus, and performs a delete request of the second data held by the external information processing apparatus if the download performed by the communication unit is canceled by the user.

13 Claims, 12 Drawing Sheets

(56) References Cited

U.S. PATENT DOCUMENTS

2014/0176997 A1* 6/2014 Adachi ................ G06F 3/1237
   358/1.15
2015/0087356 A1* 3/2015 Kobayashi ............ G06F 3/1206
   455/556.1

* cited by examiner

FIG. 7

```
<ID="1">
    <filepath subID="001">https://xxxxx.yyyy/001.jpg</filepath>
    <filepath subID="002">https://xxxxx.yyyy/002.jpg</filepath>
    <filepath subID="003">https://xxxxx.yyyy/003.jpg</filepath>
</ID>
```

701

INFORMATION PROCESSING APPARATUS, CONTROL METHOD, AND STORAGE MEDIUM

BACKGROUND OF THE INVENTION

Field of the Invention

The present invention relates to an information processing apparatus, a control method, and a storage medium.

Description of the Related Art

In an application in which a printer carries out printing from a mobile terminal (hereinafter described as a mobile terminal) such as a smart phone, there is an application that carries out printing by the mobile terminal communicating with the printer. The method is required to perform, for example, image conversion required for the printer in the mobile terminal, and the insufficient memory and the like occur due to the mobile terminal. In addition, Japanese Patent Laid-Open No. 2013-50804 discloses a technique for receiving data for printing from a server or notifying a state of printing to the server. Cloud printing is a system that performs printing using the server on a network by the mobile terminal or the printer. However, in cloud printing, there are some cases such as the case where printing data cannot be obtained and the printing fails because a line used for communicating by the mobile terminal is without power, or the case where the user impatiently cancels the printing because of the slowness of the communication line.

As described the above, in cloud printing from the mobile terminal, there are some cases where the user cancels the printing intentionally and the printing is canceled by an unexpected accident such as a communication failure. In such a case, it is necessary that the processing corresponding to both cases is performed, unnecessary communication is not performed, and unnecessary data does not remain in the mobile terminal.

SUMMARY OF THE INVENTION

The present invention provides an information processing apparatus that improves the usability by switching the processing depending on whether the processing is canceled by the user or a communication error occurs.

According to an aspect of the present invention, an image processing apparatus of an embodiment of the present invention includes a communication unit configured to transmit first data to an external information processing apparatus after receiving an instruction for printing from an user, download second data obtained by converting the first data from the external information processing apparatus, and transmit the second data to an image forming apparatus; and a processing unit configured to perform a delete request of the second data held by the external information processing apparatus if the download performed by the communication unit is canceled by the user.

According to the information processing apparatus of the present invention, the usability can be improved by switching the processing depending on whether the processing is canceled by the user or a communication error occurs.

Further features of the present invention will become apparent from the following description of exemplary embodiments with reference to the attached drawings.

BRIEF DESCRIPTION OF THE DRAWINGS

FIG. 7 is a diagram illustrating a registry configuration of an information processing apparatus.

DESCRIPTION OF THE EMBODIMENTS

First Embodiment

Hereinafter, preferred embodiments of the present invention will be described with reference to the drawings. An information processing apparatus according to the present invention stores program code of software for realizing a function described in the present embodiment in a storage medium. A computer (or CPU) reads and executes the program code stored in the storage medium, and realizes the function.

The information processing apparatus according to the present invention is a mobile terminal, in which an operating system (hereinafter abbreviated "OS") for the mobile terminal and program for controlling call and data communication are running. In the present embodiment, although a mobile terminal will be described as an example, the present invention can also be applied to a device such as a PC or a tablet.

Figure 1:
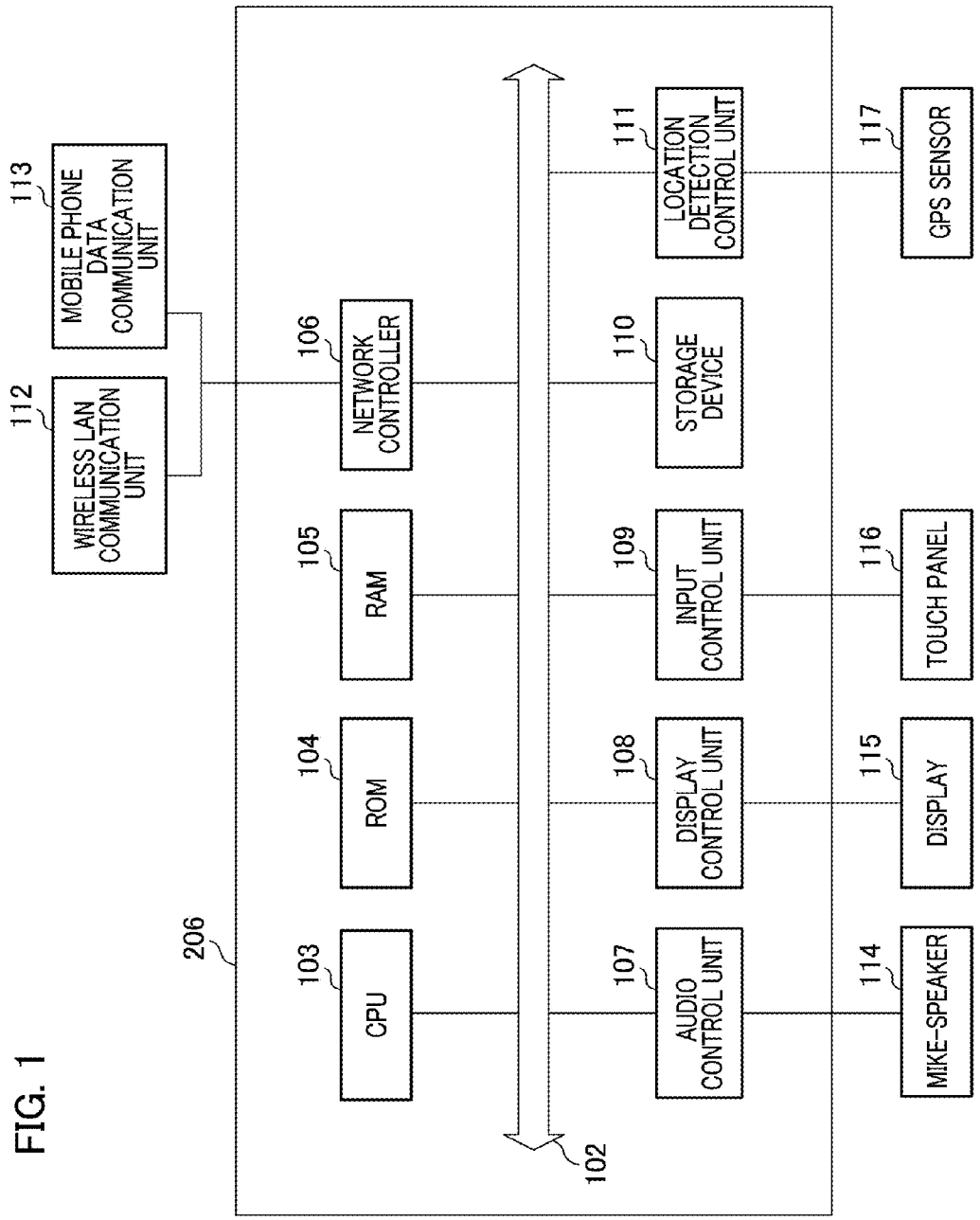
FIG. 1 is a block diagram illustrating an example of the configuration of a mobile terminal.

FIG. 1 is a block diagram illustrating an example of a hardware configuration of the mobile terminal to which the present invention can be applied. The hardware of the mobile terminal comprises a CPU 103 to a GPS sensor 117. Each hardware component is connected to the system bus 102. The CPU (Central Processing Unit) 103 executes the program stored in a ROM 104 to thereby execute various types of processing. The CPU 103 uses a RAM 105 as a work area. A ROM 104 stores an application for controlling the OS, the call, and data communication. As the application for controlling the data communication, a Mail software, a Web browser, or the like may be employed.

The RAM (random Access Memory) 105 is a working memory area for executing programs by the CPU 103. Also, the RAM 105 may be a memory for temporarily storing, for example, web page data obtained by the web browser from the web server and authentication information for accessing the web service. A storage device 110 is a non-volatile storage device that stores various operation mode settings that must be held after restarting of the mobile terminal, operation log, and the like.

A network controller 106 performs communication control of a wireless LAN communication unit 112 and a mobile phone data communication unit 113 in order to join these to the network that the mobile carriers provide. When one can join to the wireless LAN network, the network controller 106 generally prioritizes the communication with the wireless LAN. If the mobile terminal is disconnected from the network area of the wireless LAN, the network controller 106 joins to the wireless communication network which the mobile carriers provide. An audio control unit 107 is used mainly when the user is on the phone when the call application is activated. The audio control unit 107 performs the mediation with a voice control program when a mike-speaker 114 inputs and outputs audio data.

A display control unit 108 performs control of information which is output to a display of the mobile terminal. An input control unit 109 performs control of information which indicates the operation or instruction by the user via a button of the mobile terminal or a touch panel 116. The application installed on the mobile terminal provides various information to the user about the network communication and the mobile terminal by using the audio control unit 107, the display control unit 108, or the input control unit 109. A location detection control unit 111 obtains location information of the mobile terminal from the GPS sensor 117 and provides it to the OS. These controls are controlled by the OS activated by the CPU 103.

Figure 2:
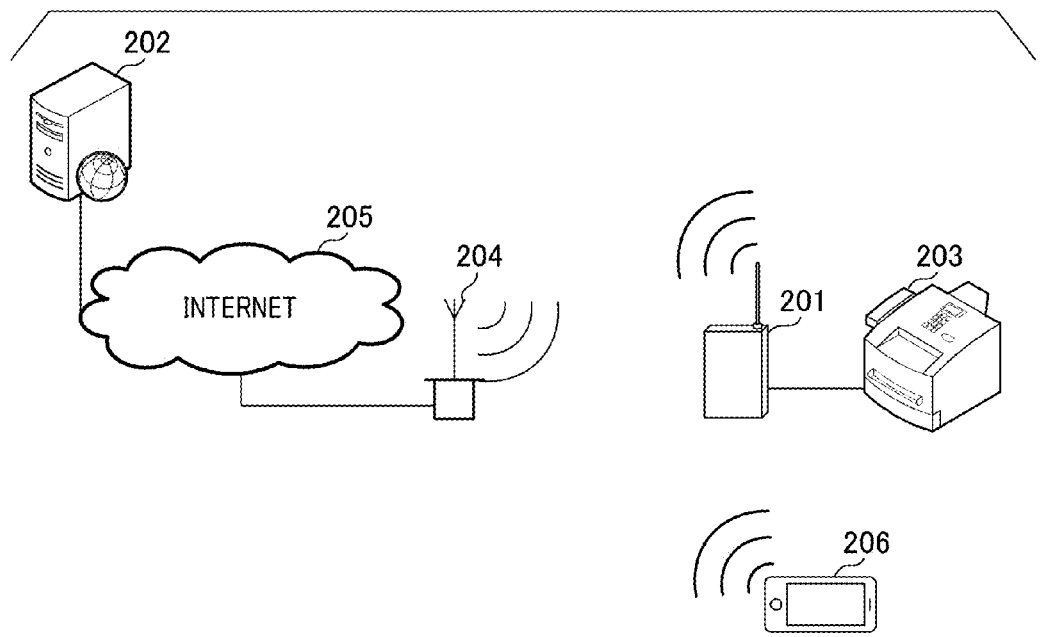
FIG. 2 is a diagram illustrating a configuration of the mobile terminal and peripheral devices thereof.

FIG. 2 is a diagram illustrating a configuration of the mobile terminal and peripheral devices thereof. FIG. 2 is the diagram illustrating a connection relationship in the network such as the mobile terminal, the wireless LAN terminal, the printer, and the web server according to the preset invention. A mobile terminal 206 comprises the hardware configuration as described in FIG. 1. The mobile terminal 206 performs data communication with a printer 203 and a web server 202 by using a wireless LAN terminal 201 or a wireless base station 204. Also, the mobile terminal 206 accesses the wireless LAN terminal 201 or the wireless network which outside mobile data communication carriers (hereinafter, referred to as "mobile carriers") provide to thereby be able to use various services.

The wireless LAN terminal 201 is a base unit of a wireless LAN having a general network-router function, and provides the wireless LAN in home or office and the like. When the mobile terminal 206 enters the wireless LAN area, the mobile terminal 206 automatically joins the network using the authentication information which has been set in advance. The printer 203, which functions as an image forming apparatus according to the present invention, joins the network via the wire or wireless LAN. The wireless LAN terminal 210 can access all of the peripheral devices and services that have joined the network.

The wireless base station 204 is a wireless communications base station which the mobile carriers provide. When the mobile terminal 206 exits the area of the wireless LAN terminal 201, the mobile terminal 206 joins the network which the wireless base station 204 provides. The web server 202 is an external information processing apparatus which provides various services on an internet 205 which is a public line. The mobile terminal 206 accesses the internet 205 via the network which the wireless base station 204 provides, and further accesses the web server 202. The URL of the web server 202 is set in a print application 304 (described below), and the user is not involved in how the web server 202 operated. In such embodiment, a cloud printing issues the print instruction to the printer 203 using the print application 304 print application.

Figure 3:
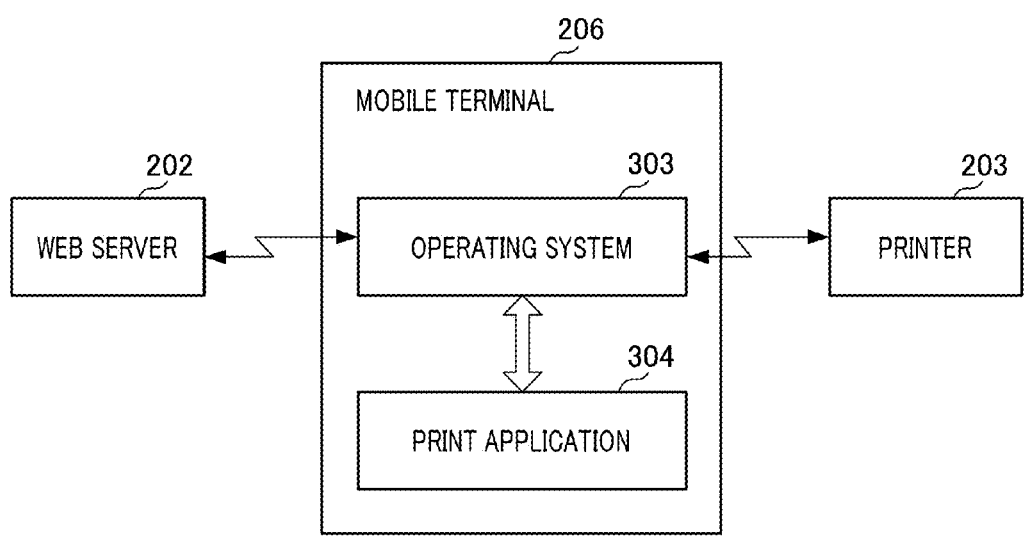
FIG. 3 is a diagram illustrating a configuration of software of the mobile terminal.

FIG. 3 is a diagram illustrating a configuration of software of the mobile terminal which can be applied in the present embodiment. The mobile terminal 206 comprises an operating system (OS) 303 and the print application 304. In the present embodiment, the print application 304 is installed in the OS 303 of the mobile terminal 206 and executed by the CPU 103. The network controller 106 controlled by the OS 303 is used for communicating with the web server 202 and the printer 203 from the print application 304.

Figure 4:
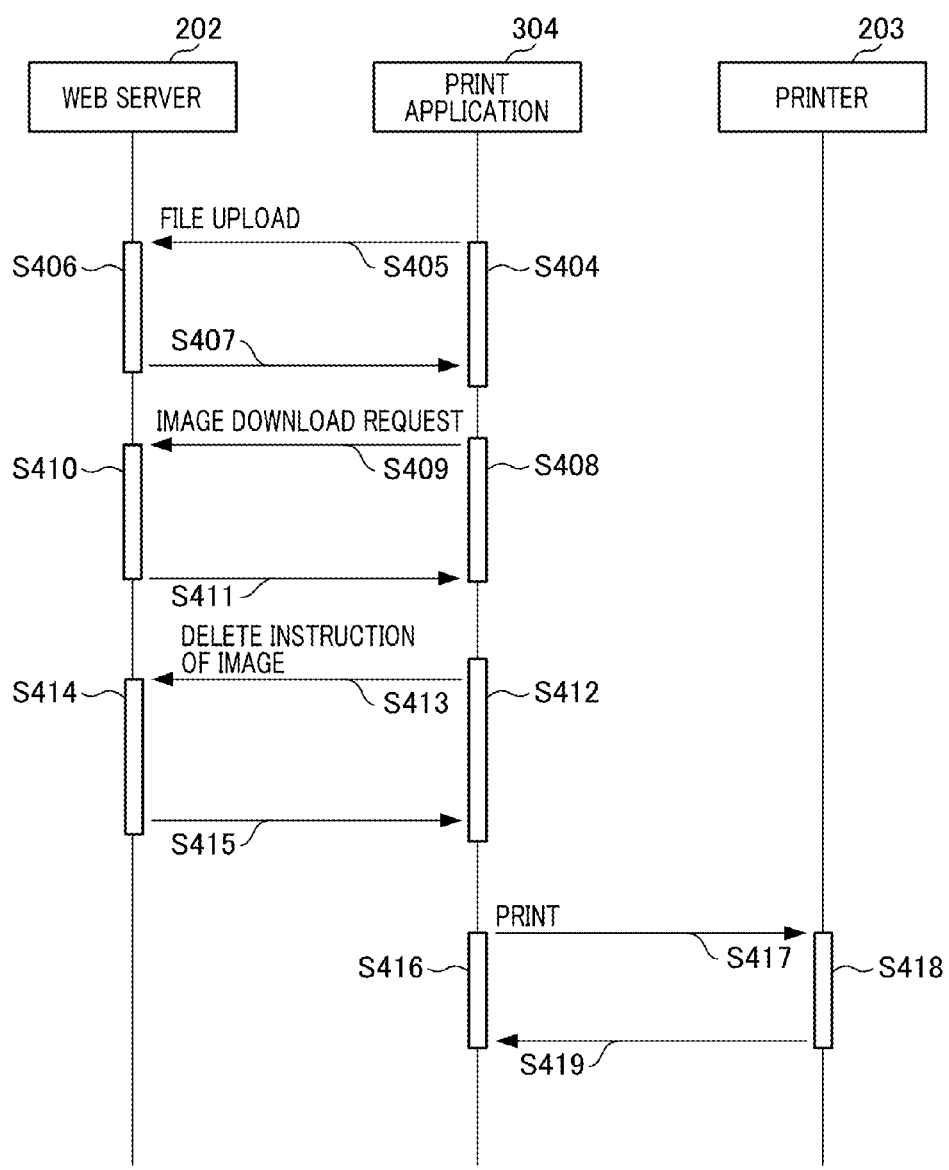
FIG. 4 is a sequence diagram illustrating cloud printing.

FIG. 4 is a sequence diagram for performing cloud printing communication between the print application 304, the web server 202, and the printer 203. The sequence diagram is a sequence for the case in which conversion is required for reasons such as the print file not being a data format appropriate for the printer, but the print application 304 cannot carry out the conversion, and the Web server 22 converts the printing file. The mobile terminal 206 stores program code for software for performing the sequence in the storage medium. The CPU 103 reads the program code stored in the RAM 105 or the storage device 110 to thereby perform each process. This can be applied in the case of realizing the flow charts after FIG. 8.

Firstly, in step S404, the print application 304 performs an upload process if the print instruction is performed by the user's operation. The print application 304 uploads the printing file to the web server 202, when, for example, a file for printing is not a suitable data format. In step S405, the print application 304 instructs the web server to upload a file to the mobile terminal 206 specified by the user.

In step S406, the web server 202 receives the file, which is a first data, from the print application 304, converts the file into the data format which the printer 203 can print, and generates an image data which is a second data. After generating the image data, in step S407, the web server 202 notifies the print application 304 that the generation of the image data is completed. At that time, in step S407, the web server 202 notifies the print application 304 about the download URL for the converted image data. The web server 202 may provide notification about a plurality of URLs for downloading, when, for example, the web server 202 converts a plurality of printing files.

Next, in step S 408, the print application 304 performs the download processing of the image data. In step S409, the print application 304 performs a download request for the image data to the web server 202 based on the URL received in step S407. In step S410, the web server 202 receives the download request from the print application 304 to allow downloading. In step S411, the web server 202 sends the image data specified by the URL in step S 409 to the print application 304 as a response. In step S412, the print application 304 receives the response in step S411 to thereby complete downloading the image data. In this manner, the print application 304 receives the image data, which has been converted into the format that the printer 203 can print, from the web server 202. If there is a plurality of URLs for downloading, the processing of steps S408 to S411 is performed a plurality of times.

Next, in step S412, the print application 304 performs a delete processing for the image data in the web server 202. This is because the download of the image data is completed by the processing of step S411, and the image data does not need to be held in the web server 202. In a following description, although step S412 is performed immediately after step S408, the timing of the performing of step S412 may be performed after step S408. Therefore, even if there is a plurality of URLs for downloading and there is image data which has not been completely downloaded among the plurality of the image data, the print application 304 may instruct the web server 202 to delete the downloaded file for the image data which has been downloaded. In step S413, the print application 304 performs the delete processing of the file downloaded in step S411 from the web server. In the delete processing, the download URL used in step S409 is specified. If there are the plurality of the URLs for downloading, the print application 304 may complete the process with one an instruction by managing using ID or tagging of a download URL group. In step S414, the web server 202 performs the delete processing of the image data for which instruction was provided in step S409. After completing the delete processing of the image data, in step S415, the web server 202 notifies the print application 304 that the deletion of the image data has completed.

Next, in step S416, the print application 304 performs the print instruction in the printer 203. In step S417, the print application 304 sends the image data obtained in step S411 and causes the printer 203 to start printing. In step S418, the printer 203 performs printing upon the receipt of the print instruction from the print application 304. In step S419, after the printer 203 completes obtaining the image data required to for printing and performs the printing, the printer 203 notifies the print application 304 that the printing has been completed.

Figure 5:
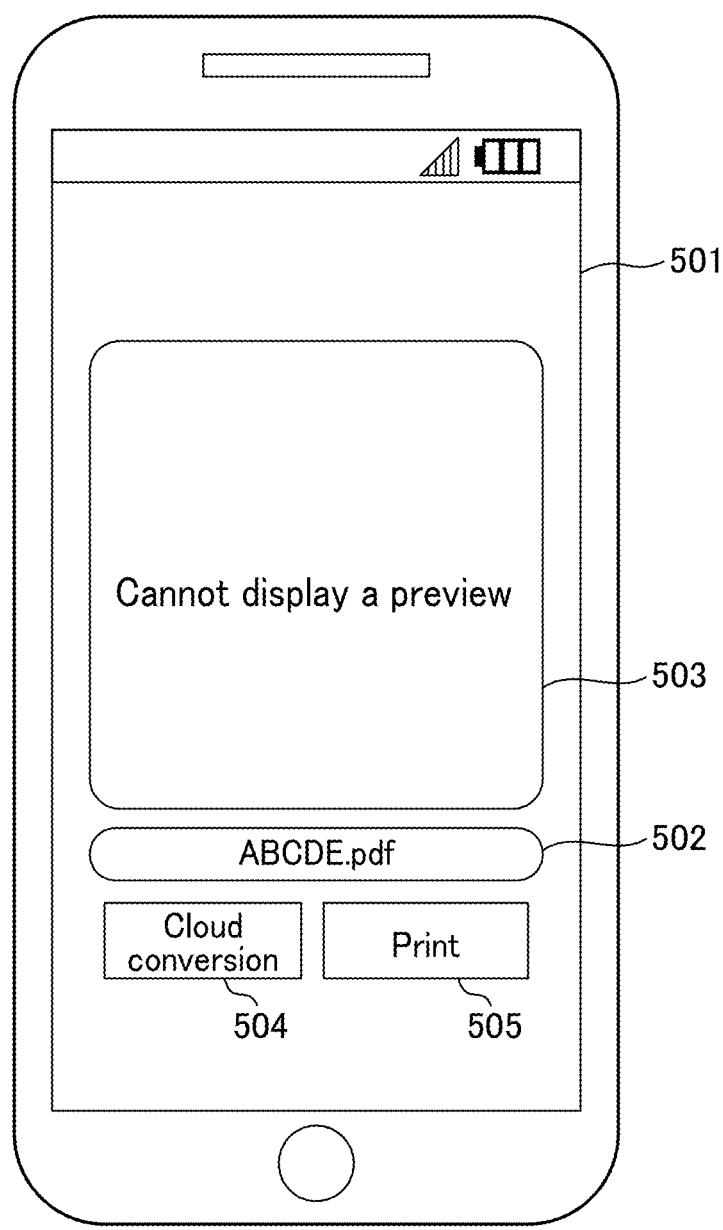
FIG. 5 is a diagram illustrating an example of a UI of a print application in mobile terminal.

FIG. 5 is a diagram illustrating a UI of the print application in the mobile terminal. A UI 501 of the print application 304 is displayed on a display 115 via the display control unit 108 shown in FIG. 1. A preview of the file which the user would like to print is displayed on a preview display unit 503. However, if the format which corresponds to the OS 303 or the print application 304 is being printed, the preview may not be displayed on the preview display unit 503. In this case, the web server 202 converts the printing file. In FIG. 5, the preview display unit 503 displays a message, which indicates that the preview cannot be displayed, on the display. A file selection unit 502 is an item for selecting the printing file. Then, the preview of the selected file is displayed on the preview display unit 503.

A cloud conversion instruction button 504 is an instruction button for cloud converting the file selected by the file selection unit 502 using the web server 202. The print application 304 sends the file selected by the file selection unit 502 if the user presses the cloud conversion instruction button 504 (step S405). Although a name of the button may not be limited to the cloud conversion instruction, it is preferable to inform the user using cloud conversion rather than the name of the server. A print instruction button 505 is a print instruction button for issuing an instructing for printing to the printer 203. If the user presses the print instruction button 505, the print application 304 sends the image downloaded from the web server 202 in step S411 to the printer and issues instructions for printing (step S416). The print instruction button 505 may be configured so that the user cannot press it before pressing the cloud conversion instruction button 504.

Figure 6:
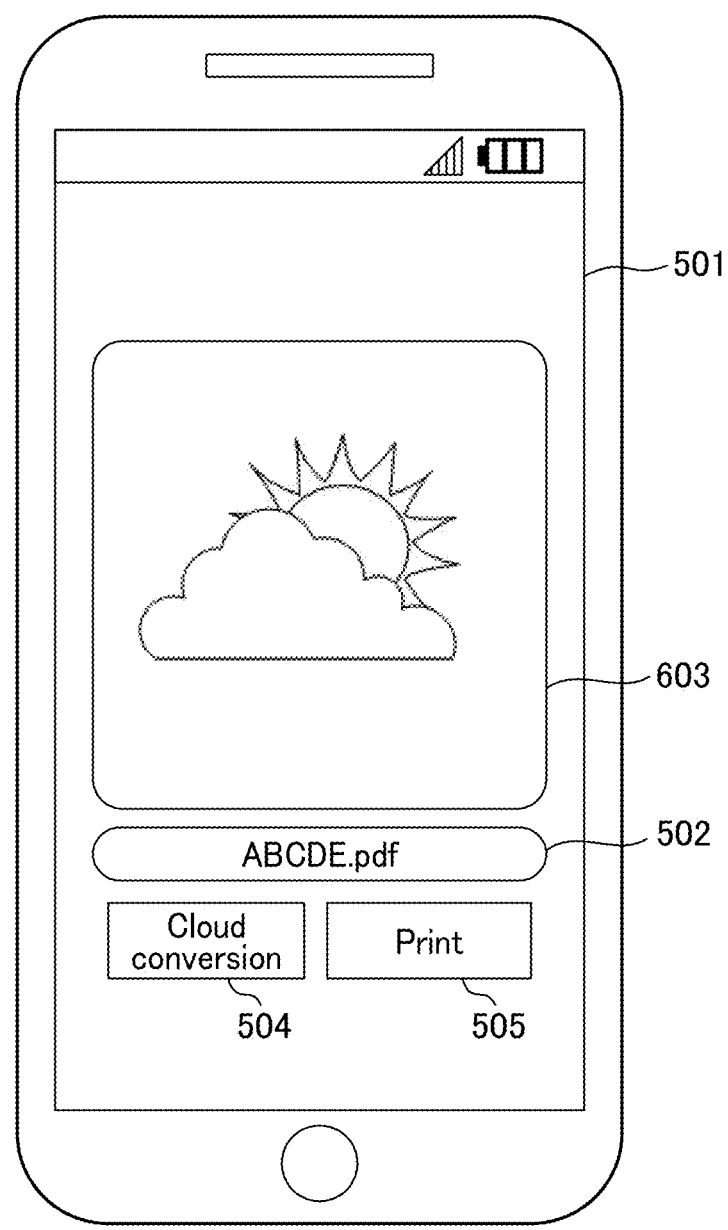
FIG. 6 is a diagram illustrating an example of a UI of a print application in mobile terminal.

FIG. 6 is a diagram illustrating a UI of the print application in the mobile terminal. If the print application 304 downloads the image for printing from the web server in step S411, the image and the preview of the file selected by the file selection unit 502 are displayed on the preview display unit 503.

FIG. 7 is a diagram illustrating an example of a download URL 701 of the image data which the print application 304 receives from the web server. The download URL 701 is a download URL of the converted image data, and to the print application 304 is notified about this in step S407. The download URL 707 has ID which uniquely identifies the image generated by the web server 202, in which a plurality of URLs is described if there is a plurality of the generated image data. One URL is generated by one image file, and the print application 304 performs the download of the image data by accessing the URL of the download URL 707 (step S409).

As described the above, cloud printing is explained using the print application if applying the present embodiment. A description will be given of a method for holding the downloaded image which is a feature of the present embodiment.

Figure 8:
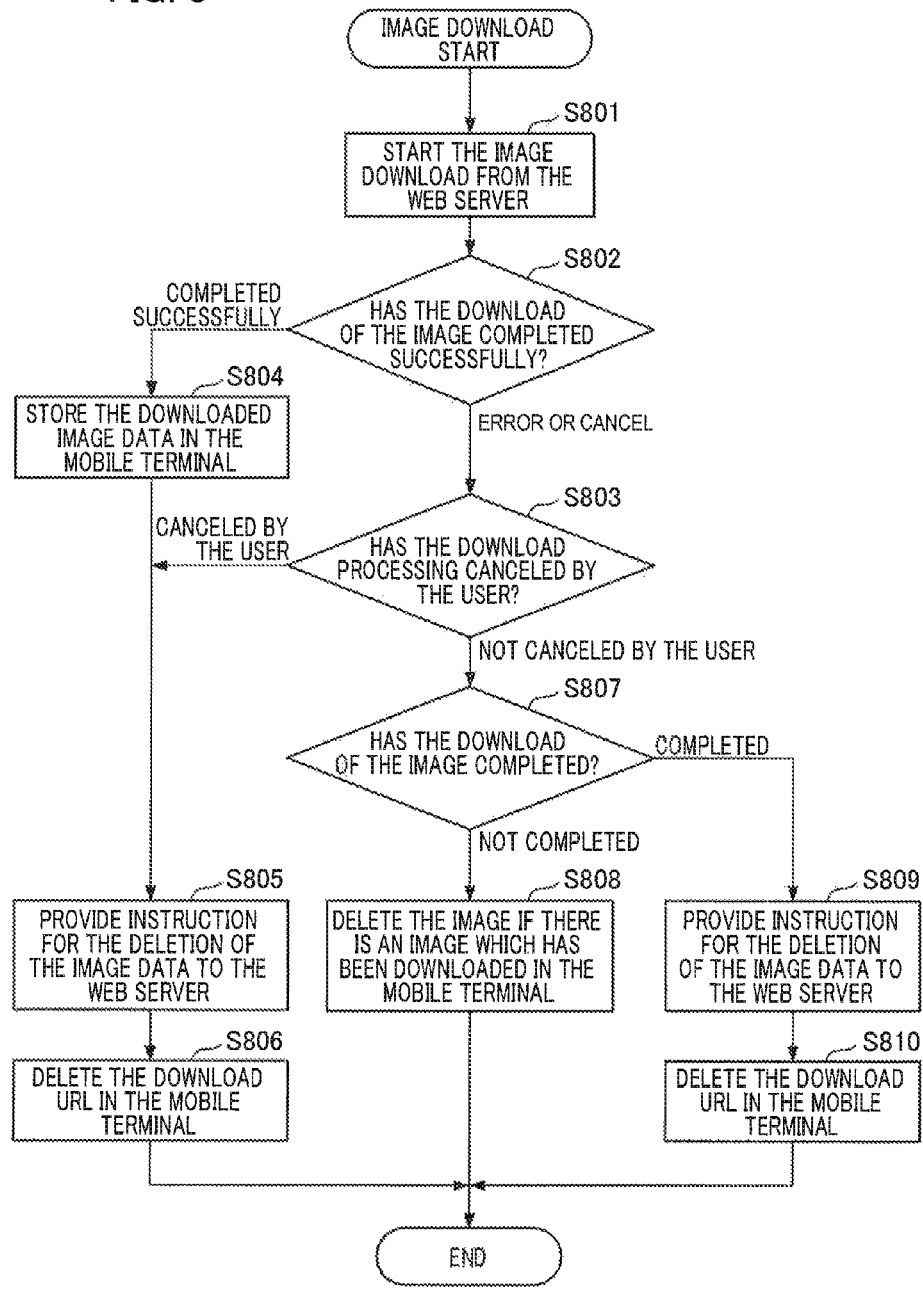
FIG. 8 is a flowchart illustrating deleting processing of a downloaded image.

FIG. 8 is a flowchart illustrating a deleting process of a downloaded image. The print application 304 determines whether or not to execute the download process of the image in step S408 and the deleting process of the image in step S412, according to a situation.

Firstly, in step S801, the print application starts to download the image from the web server 202. Next, in step S802, the print application 304 determines whether or not the download of the image has completed successfully. The case which the download of the image has not completed successfully is considered, for example, the case in which the download has been canceled by the user or a communication error has occurred. The communication error indicates, for example, the state that a communication failure between the mobile terminal 206 and the wireless LAN terminal 201 has occurred and the mobile terminal 206 cannot communicate with the web server 202. If the download of the image has completed successfully, the processing proceeds to step S804. If the error occurs or the download has been canceled by the user, the processing proceeds to step S803.

In step S804, the print application 304 stores the image data which has been downloaded in the mobile terminal 206. Next, in step S805, the print application 304 performs the delete process of the image data generated by the web server 202 to the web server 202. Since all image data have been downloaded in the print application 304, the resource of the storage of the web server 202 is released. Next, in step S806, the print application 304 deletes the download URL 701. Since the download of the image data has been completed, it is not required for the mobile terminal 206 to access to the download URL 701. However, in the present embodiment, the print application 304 stores the image data which has been downloaded in consideration of the possibility reprinting.

If the print application 304 determines that an error has occurred or the download processing has been canceled by the user in step S802, the processing proceeds to step S803. In step S803, the print application 304 determines whether or not the download processing has been canceled intentionally by the user during downloading. Here, the intentional cancellation by the user indicates an action that the user presses the cloud conversion instruction button 504 again or presses a cancel button prepared separately from the cloud conversion instruction button 504. If the download processing is canceled intentionally by the user, the processing proceeds to step S805. Then the processing ends after performing the processing as described the above. If the download processing is not canceled intentionally by the user (i.e., the download processing is canceled by the communication failure, crash of the application, or the like), the processing proceeds to S807.

In step S807, the print application 304 determines whether or not the downloading of all images started in step S801 has completed. If the download has not completed, the processing proceeds to step S808. If the download has completed, the processing proceeds to step S809. If there is a plurality of downloaded images, the print application 304 determines whether or not all the images have been downloaded. In step S808, the print application 304 deletes the image which has been downloaded in the mobile terminal 206. Note that the downloaded image to be deleted is a portion of the images among the plurality of the downloaded images which have been downloaded or an incomplete file (an image), which results in an error during downloading. If the user attempts to reprint after the failure of printing by the communication error once, for example, if the user provides instructions for reprinting after restarting of the print application, it is required for the print application 304 to download the image from the web server again. Therefore, if the download is not completed, the delete instruction of the image data or the deletion of the download URL is not executed. In addition, the print application 304 deletes the portion of the image data has been downloaded to thereby prevent unnecessary data to remain.

In S809, the print application 304 performs the delete processing of the image data generated by the web server 202 for the web server 202. This processing is the same processing in step S805. If the processing in step S809 is performed, it is not necessary to hold the image data in the web server 202 because all images have been downloaded. Next, the processing proceeds to step S810, and the print application 304 deletes the download URL 701. This processing is the same processing in step S806. Also, it is required to hold the image which has been downloaded in preparation for reprinting. With the above processing, if the error such as the communication failure occurs, the print application 304 switches the processing depending on whether or not the image has been downloaded.

Figure 9:
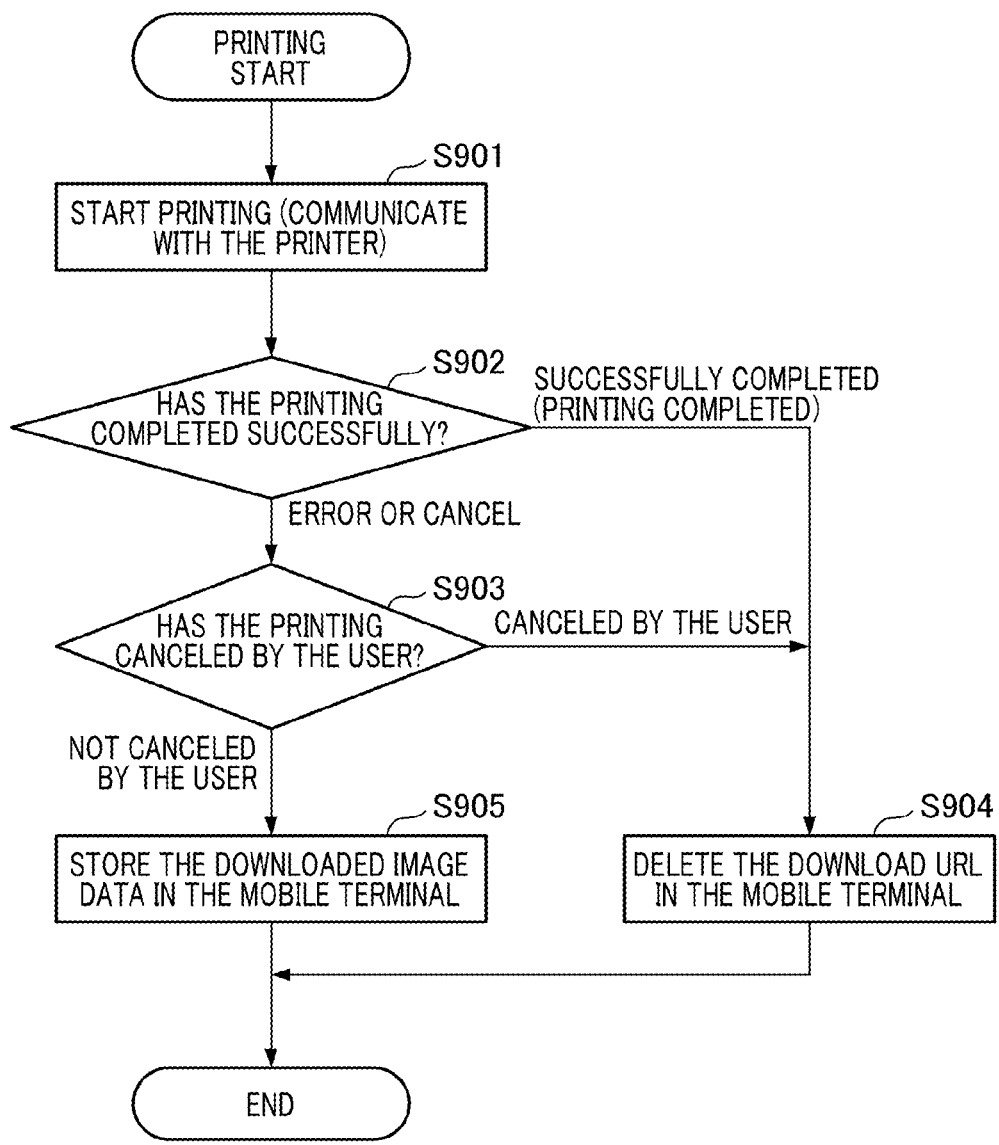
FIG. 9 is a flowchart illustrating error processing during a print processing.

FIG. 9 is a detailed flowchart illustrating the print processing performed by the print application 304 in step S416. Firstly, in step S901, the print application 304 communicates with the printer 203 and provides instructions for printing. Next, in step S902, the print application 304 determines whether or not the printing has completed successfully. The case where the printing has not completed successfully is indicated, for example, in the case where the printing has been canceled by the user or the case where the error occurs. The error in the processing in FIG. 9 means, for example, the state in which the communication failure occurs between the mobile terminal 206 and the printer 203 occurs and thereby they do not communicate, or the case where the printing cannot continue due to a paper jam in the printer 203 or the like. If the printing has completed successfully, the processing proceeds to step S904. If the error has occurred or the printing has canceled, the processing proceeds to step S903. If the processing proceeds to step S904, the print application 304 deletes the image data which has been downloaded to the mobile terminal 206 because the printing has completed successfully.

If the processing proceeds to step S903, the print application 304 determines whether or not the communication has been canceled intentionally by the user during printing in step S903. If the communication has been canceled intentionally by the user, the processing proceeds to step S904. Then the print application 304 deletes the image data which has been downloaded. If the communication has not been canceled intentionally by the user, i.e., if the communication failure or the paper jam has occurred, the processing proceeds to step S905. In step S905, the print application 304 stores the image data which has been downloaded in the mobile terminal 206. With the above processing, if the printing has completed successfully or the communication has been canceled intentionally by the user, the image data which has been downloaded is deleted. On the other hands, if the error that has not occurred intentionally, the image data which has been downloaded is held. Thus, upon reprinting, it is not required for the mobile terminal 206 to download the image data from the web server 202 again, and the mobile terminal 206 can perform a recovery processing efficiently.

Figure 10:
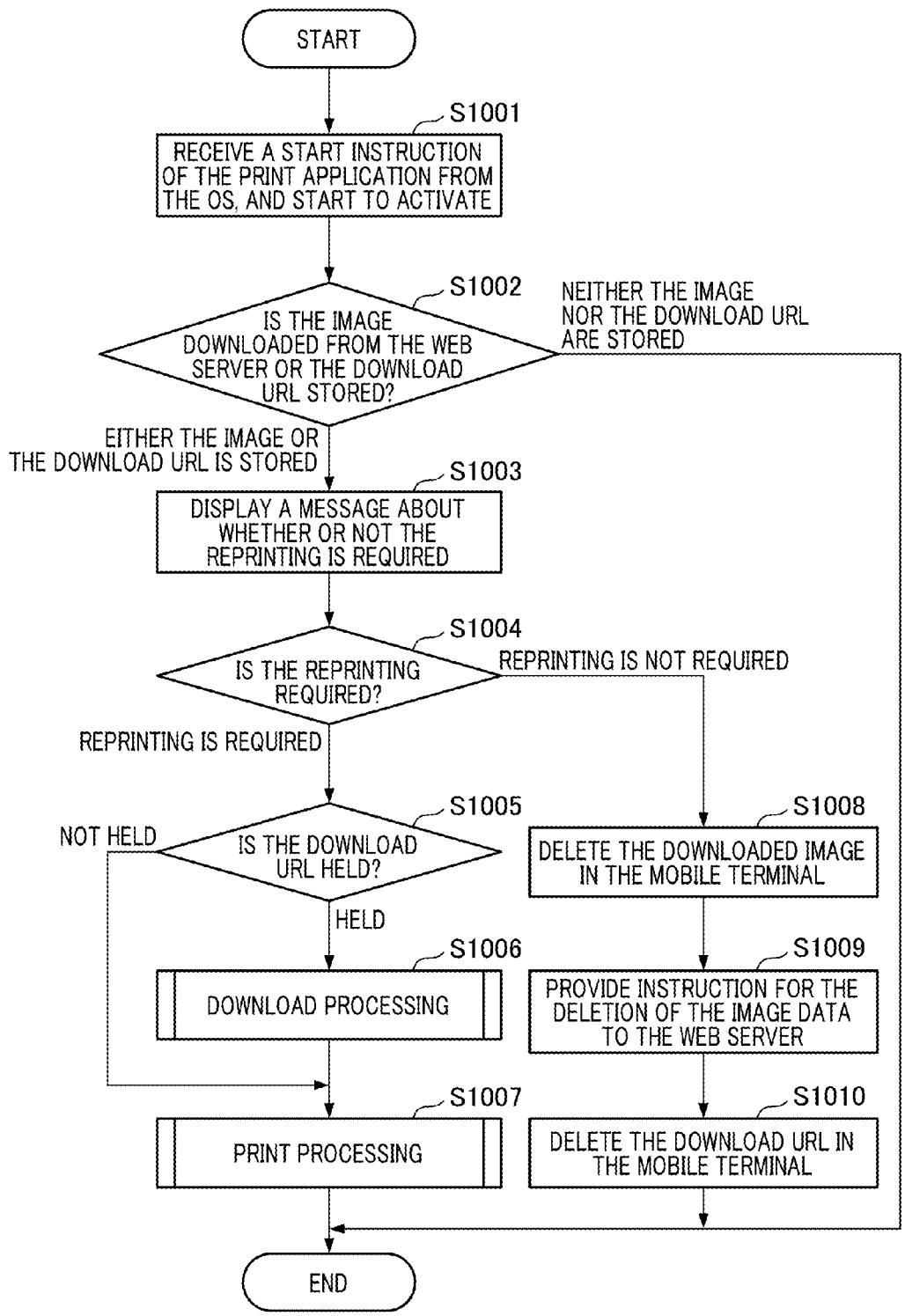
FIG. 10 is a flowchart illustrating re-printing processing performed by the print application.

FIG. 10 is a flowchart illustrating a re-printing (retry) processing performed by the print application after restarting. If the processing according to the flowchart of FIG. 10 is performed, the image data can be reused by the flowcharts of FIGS. 8 and 9 when there is the image data which has been downloaded.

Firstly, in step S1001, the print application 304 receives a start instruction from the OS 303, and starts to activate. Next, in step S1002, the print application 304 determines whether or not the image downloaded from the web server and the download URL 701 are stored. If neither of the image and the download URL 701 are stored, the print application is activated normally. Then the retry processing ends. If either of the image or the download URL 701 is stored, the processing proceeds to step S1003. In step S1003, the print application 304 displays a message about whether or not the reprinting is required.

Figure 11:
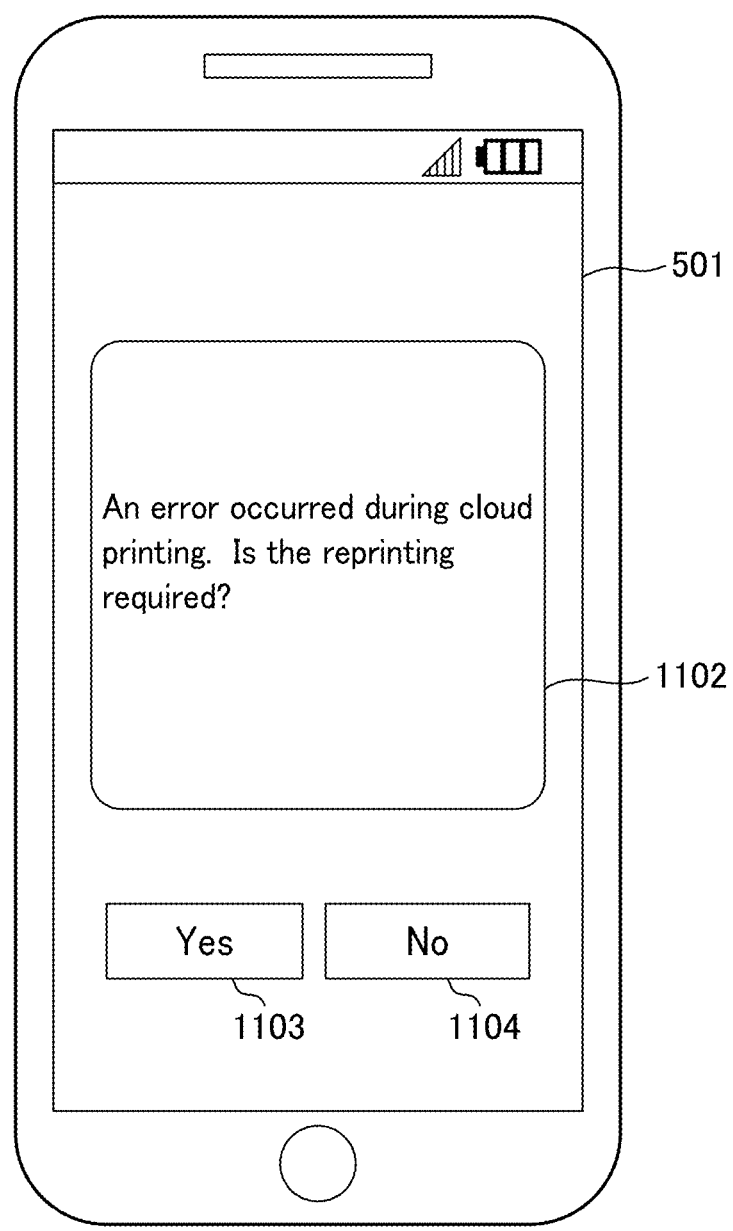
FIG. 11 is a diagram illustrating an example of a UI of the re-printing processing displayed by the print application.

This massage UI is illustrated in FIG. 11. A message display screen 1102 is displayed on a reprinting screen illustrated in FIG. 11. Also, a reprinting instruction button 1103 and a reprinting cancel button 1104 are displayed on the reprinting screen. If the user presses the button, the instruction about whether or not the reprinting is to be performed is transmitted to the print application 304.

In step S1004, the print application 304 receives an instruction about whether or not the reprinting is to be performed from the reprinting UI displayed in step S1103, which is illustrated in FIG. 11. If the print application 304 receives the instruction that the reprinting is to be performed from the reprinting UI by the user, the processing proceeds to step S1005. If the print application 304 does not receive the instruction about the reprinting by the user, the processing proceeds to step S1008. If the reprinting is performed, in step s1005, the print application 304 determines whether or not the download URL 701 is held. If the download URL 701 is held, the processing proceeds to step S1006. Then a re-downloading is performed. The re-downloading is performed according to the flowchart of FIG. 8. If the download URL 701 is not held, the printing processing is performed in step S1007 because the image data which has been downloaded is held. This printing processing is performed according to the flowchart of FIG. 9.

With this manner, if the image data downloaded from the web server 202 in step S1002 is stored or if the download URL 701 is stored, cloud printing can be restarted without performing the upload processing in step S404. If the print application 304 receives the instruction for cancelling the reprinting in step S1004, in step S1008, the print application 304 deletes the stored download image. The image does not have to be used because the reprinting is not performed. Then, the processing proceeds to steps S1009 and S1010. The processing in step S1009 is the same processing as that in step S805, i.e., the print application 304 performs the delete processing of the image data to the web server 202. The processing in step S1010 is the same processing in step S806, i.e., the print application 304 deletes the download URL 701 stored in the mobile terminal 206.

As described the above, according to the present embodiment, in cloud printing from the mobile terminal, if the downloading of the image or the printing is canceled by an unintentional error of the user, data required for reprinting is held. Therefore, the reprinting can be performed efficiently without unnecessary communication.

Second Embodiment

In the first embodiment, the unit configured to hold data required for reprinting and to perform the reprinting if the downloading of the image or the printing is canceled by an unintentional error of the user in cloud printing from the mobile terminal has been described. The screen of the mobile terminal becomes hidden automatically by auto OFF or when the user activates and operates another application while the application is performing a time consuming processing such as communication. In a second embodiment, a description will be given of a processing for changing error processing depending on the state of a UI screen when an error of the print application occurs.

Figure 12:
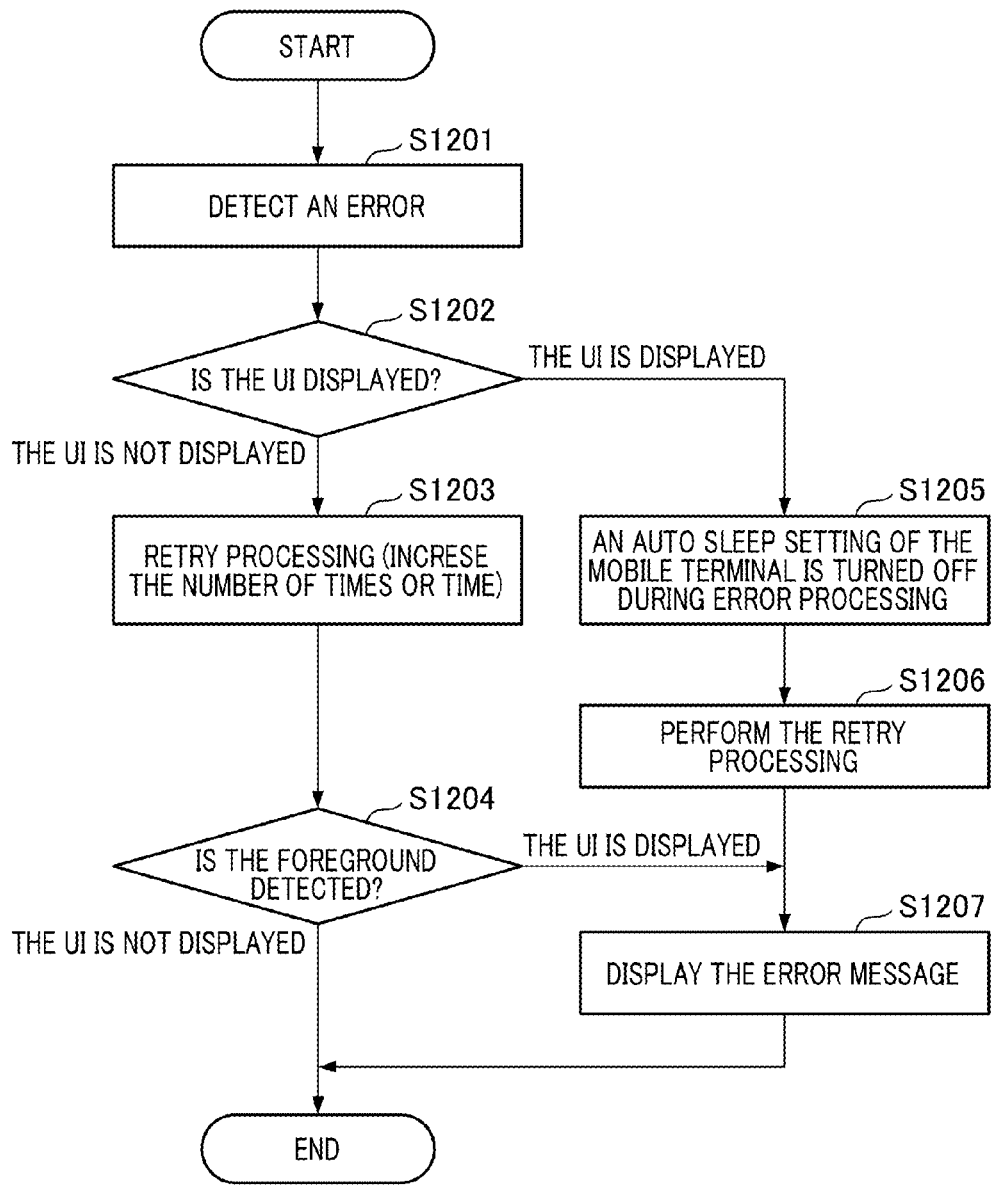
FIG. 12 is a flowchart illustrating the change of error processing depending on a display state of the UI.

In the present embodiment, since the configuration of each apparatus and the processing flow is the same as that described in FIGS. 1 to 11 in the first embodiment, a description thereof is omitted. FIG. 12 is a flowchart illustrating the change of the error processing depending on the state when an error of the print application occurs. The flowchart of FIG. 12 is enabled for all processing performed by the print application 304 shown in FIG. 4, the processing can be executed any time an error occurs.

Firstly, in step S1201, the print application 304 detects the error. This error means a communication failure, an insufficient memory during downloading, or the like. Next, in step S1202, the print application 304 determines whether or not a UI of the print application 304 is displayed on the display of the mobile terminal. The state in which the UI displays on the display of the mobile terminal means a foreground state which the user sees the display and can recognize the UI of the print application 304. If the UI is not displayed, the processing proceeds to step S1203. If the UI is displayed, the processing proceeds to step S1205.

In step S1203, the print application 304 performs the retry processing. Here, in communication with the printer 203, it is assume that the communication failure occurs. At this time, the retry processing of the communication is performed. However, even if the processing takes more time than normal, it has little affect on the recognition of the user because the UI is not displayed. Therefore, the error processing can be changed and performed by increasing the number of times of transmission of the file or increasing transmission time so that a longer communication timeout time is taken. After finishing the retry processing, the processing proceeds to step S1204.

In step S1204, the print application 304 performs a detection determination about whether or not the state of the print application 304 is in the foreground state. If the print application 304 is shifted to the foreground state, the processing proceeds to step S1207. In other words, if the operation of the user on the display is detected during the retry processing, the print application 304 stops the retry processing and displays the error message on the screen. If the state of the print application 304 is not the foreground state, the processing flow ends after finishing the retry processing because the print application 304 cannot display on the display.

If the UI is displayed in S1202, the processing proceeds to step S1205. Then, in step S1205, the auto sleep setting of the mobile terminal 206 is turned off. The auto sleep setting is a function prepared in the mobile terminal for automatically turning off the screen when the button is not pressed for a predetermined period of time or an operation such as scrolling of the screen is not performed. If the auto sleep setting is valid, the screen is turned off in the middle of the error processing even if the error message is displayed on the UI to the user.

Next, the processing proceeds to step S1206, and then the retry processing is performed. In this processing, processing in which the number of times of retry is increased or the transmission time is increased to make a long communication timeout time as step S1203 is not performed. Since the UI of the print application 304 is displayed, the user is stressed by spending a long time on the retry processing. Therefore, after performing the normal retry processing, if the error has not recovered, the processing proceeds to step S1207. Then the message after the error processing is displayed and the processing flow ends.

Figure 13:
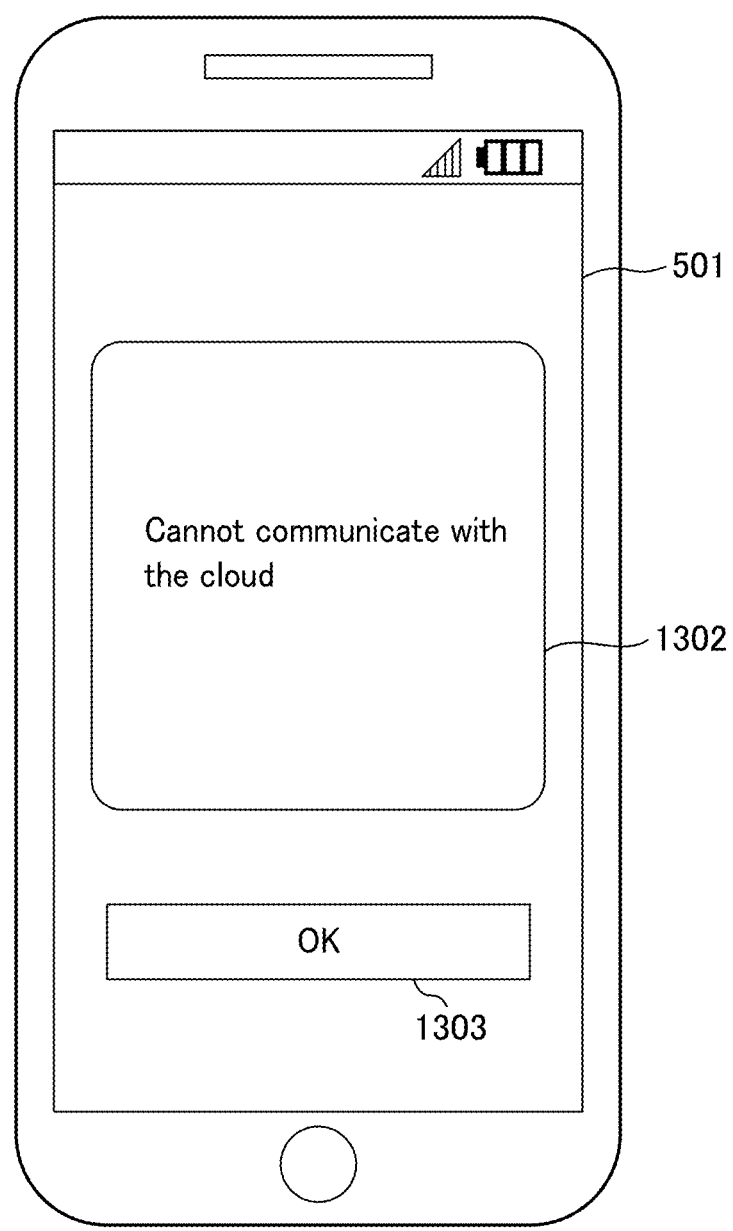
FIG. 13 is a diagram illustrating an example of the UI indicating an error message displayed by the print application.

FIG. 13 is a diagram illustrating the UI of an error message of the print application in the mobile terminal. A message display unit 1302 is displayed on the UI of the print application 304, and in step S1207, the result of the error processing performed by the print application 304 is displayed. The message such as improvement not being possible in spite of the retry processing is displayed on the message display unit 1302. Also, an error confirmation button 1303 is displayed. If the user confirms the details of the error and presses the button, the screen can return to the normal screen of the print application 304.

As described the above, in the present embodiment, the processing for changing the retry processing such as increasing the number of times of the retry depending on the display state of the UI when the error of the print application 304 occurs has been described. The user can be notified about result of the error without any stress by changing the processing depending on the display state of the UI.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-222627, filed on Oct. 25, 2013, which is hereby incorporated by reference herein in its entirety.

What is claimed is:

1. An information processing apparatus, comprising:
a processor; and
a memory storing a computer program that, when executed by the processor, causes the processor to perform:
uploading first data to an external information processing apparatus after receiving an instruction for printing from a user of the information processing apparatus;
receiving a download URL specifying a location of image data, wherein the image data is created by the external information processing apparatus by converting the uploaded first data;
downloading the image data based on the received download URL; transmitting the downloaded image data to an image forming apparatus;
receiving, from the user of the information processing apparatus during the download of the image data, an instruction for canceling a processing for downloading the image data; and
requesting, using the download URL, the external information processing apparatus to delete the image data that is stored in the location specified with the download URL if the instruction for canceling the processing for downloading the image data is received during the download of the image data.

2. The information processing apparatus according to claim 1, wherein, if a communication error occurs during the download of the image data and printing of the image data is retried, the processor further performs:
re-downloading the image data based on the download URL; and
transmitting the re-downloaded image data to the image forming apparatus.

3. The information processing apparatus according to claim 1, wherein, if a communication error occurs during the download of the image data, the processor further performs:
a retry processing for re-downloading the image data based on the download URL; and
transmitting the re-downloaded image data to the image forming apparatus, and
wherein, if a communication error occurs during the transmitting the downloaded image data to the image forming apparatus, the processor further performs re-transmitting the downloaded image data which has been already downloaded in the information processing apparatus to the image forming apparatus without re-downloading the image data.

4. The information processing apparatus according to claim 1,
wherein, if an instruction for cancelling the transmission of the downloaded image data to the image forming apparatus is received from the user during the transmission of the downloaded image data to the image forming apparatus, the processor deletes the image data which has been already downloaded in the information processing apparatus.

5. The information processing apparatus according to claim 3, wherein, if the communication error occurs during the download of the image data, the processor further performs:
holding the download URL in the information processing apparatus;
re-downloading the image data based on the held download URL; and
transmitting the re-downloaded image data to the image forming apparatus.

6. The information processing apparatus according to claim 3, wherein, if the communication error occurs during the download of the image data, the processor holds the download URL in the information processing apparatus,
wherein, if the download URL is held in the information processing apparatus when an application for the printing is restarted, the processor further performs displaying a re-printing screen on a display of the information processing apparatus, and
wherein, if an instruction has been provided for the re-printing on the re-printing screen, the processor further performs:
re-downloading the image data based on the held download URL; and
transmitting the re-downloaded image data to the image forming apparatus.

7. A method for controlling an information processing apparatus, comprising:
uploading first data to an external information processing apparatus after receiving an instruction for printing from a user of the information processing apparatus;
receiving a download URL specifying a location of image data, wherein the image data is created by the external information processing apparatus by converting the uploaded first data;
downloading the image data based on the downloaded URL;
transmitting the downloaded image data to an image forming apparatus;
receiving, from the user of the information processing apparatus during the download of the image data, an instruction for canceling a processing for downloading the image data; and
requesting, using the download URL, the external information processing apparatus to delete the image data that is stored in the location specified with the download URL if the instruction for canceling the processing for downloading the image data is received in the receiving during the download of the image data.

8. The method according to claim 7, wherein, if a communication error occurs during the download of the image data and printing of the image data is retried, the method further comprises performing:
re-downloading the image data based on the download URL; and
transmitting the re-downloaded image data to the image forming apparatus.

9. The method according to claim 7, wherein, if an occurrence of a communication error is detected during the download of the image data, the method further comprises performing:
a retry processing for re-downloading the image data based on the download URL; and
transmitting the re-downloaded image data to the image forming apparatus, and
wherein, if an occurrence of a communication error is detected during the transmitting the downloaded image data to the image forming apparatus, a retry processing for re-transmitting the downloaded image data which has been already downloaded in the information processing apparatus to the image forming apparatus is performed.

10. The method according to claim 7
wherein, if an instruction for cancelling the transmission of the downloaded image data to the image forming apparatus is received from the user during the transmission of the downloaded image data to the image forming apparatus, the image data which has been already downloaded in the information processing apparatus is deleted.

11. The method according to claim 9, wherein, if the communication error occurs during the download of the image data, the method further performs:
holding the download URL in the information processing apparatus;
re-downloading the image data based on the held download URL; and
transmitting the re-downloaded image data to the image forming apparatus.

12. The method according to claim 9, wherein, if the communication error occurs during the download of the image data, the download URL is held in the information processing apparatus,
wherein, if the download URL is held in the information processing apparatus when an application for the printing is re-started, a re-printing screen is displayed on a display of the information processing apparatus, and
wherein, if instructions are provided for re-printing on the re-printing screen, re-downloading the image data based on the held download URL and transmitting the re-downloaded image data to the image forming apparatus is performed.

13. A non-transitory storage medium storing a readable program for causing a computer to execute a controlling method executed in an information apparatus, the program comprising computer executable code to perform:
uploading first data to an external information processing apparatus after receiving an instruction for printing from a user of the information processing apparatus;
receiving a download URL specifying a location of image data, wherein the image data is created by the external information processing apparatus by converting the uploaded first data;
downloading the image data based on the received download URL;
transmitting the downloaded image data to an image forming apparatus;
receiving, from the user of the information processing apparatus during the download of the image data, an instruction for canceling a processing for downloading the image data; and
requesting, using the download URL, the external information processing apparatus to delete the image data that is stored in the location specified with the download URL, if the instruction for canceling the processing for downloading the image data is received in the receiving during the download of the image data.

* * * * *